United States Patent [19]

Hayashi

[11] Patent Number: 5,138,512

[45] Date of Patent: Aug. 11, 1992

[54] SYSTEM FOR CHECKING THE OPENING AND CLOSING OF A CASSETTE LID

[75] Inventor: Yoichi Hayashi, Kanagawa, Japan

[73] Assignee: Fuji Photo Film Co., Ltd., Kanagawa, Japan

[21] Appl. No.: 569,035

[22] Filed: Aug. 17, 1990

[30] Foreign Application Priority Data

Aug. 22, 1989 [JP] Japan .................. 1-215735

[51] Int. Cl.⁵ .............................................. G11B 15/18
[52] U.S. Cl. ...................................................... 360/137
[58] Field of Search .................. 369/53, 58; 360/90, 360/93, 132, 134, 137

[56] References Cited

U.S. PATENT DOCUMENTS

| | | | |
|---|---|---|---|
| 4,899,245 | 2/1990 | Kubota | 360/137 |
| 4,947,277 | 8/1990 | Kubota | 360/137 |
| 4,951,167 | 8/1990 | Hiramoto et al. | 360/132 |

FOREIGN PATENT DOCUMENTS

| | | | |
|---|---|---|---|
| 60-151865 | 8/1985 | Japan . | |
| 60-151866 | 8/1985 | Japan . | |
| 1-010480 | 1/1989 | Japan | 360/137 |
| 0100782 | 4/1989 | Japan | 360/137 |
| 1-140453 | 6/1989 | Japan | 360/137 |
| 1-232592 | 9/1989 | Japan . | |

*Primary Examiner*—Stuart S. Levy
*Assistant Examiner*—Edward H. Sikorski
*Attorney, Agent, or Firm*—Sughrue, Mion, Zinn Macpeak & Seas

[57] ABSTRACT

A cassette inspecting system for inspecting the function of a lid of a cassette which is urged toward the closed position by a lidspring inspects whether the urging force of the lid spring is between an upper limit and a lower limit. An arm is mounted on a base for rotation about an axis between its first and second end portions in a first direction and a second direction opposite to the first direction. The base is movable to move the arm together therewith substantially in the first direction, thereby causing the first end portion of the arm member to abut against the lid in the first direction and to urge the lid toward the open position. A balancer fixed to the second end portion of the arm urges the first end portion in the first direction with a force substantially equivalent to the lower limit of the urging force of the lid spring. A coil spring urges the first end portion in the first direction when the counterforce of the lid which acts on the front end portion of the arm as the base moves in the first direction overcomes the force provided by the balancer, and displaces the arm in the second direction by a predetermined angle. The sum of the urging forces of the balancer and the coil spring is substantially equivalent to the upper limit of the urging force of the lid spring. A position sensor detects the displacement of the arm in the second direction.

5 Claims, 2 Drawing Sheets

SYSTEM FOR CHECKING THE OPENING AND CLOSING OF A CASSETTE LID

BACKGROUND OF THE INVENTION

1. Field of the Invention

This invention relates to a cassette inspecting system, and more particularly to a cassette inspecting system for inspecting the function of a lid which is spring-urged toward the closed position in a cassette such as a video cassette.

2. Description of the Prior Art

For example, a VHS video cassette is provided with a lid called a guard panel which is movable between an open position and a closed position and is spring-urged toward the closed position.

When manufacturing such a video cassette, it is necessary to inspect whether the lid can be correctly opened and closed, and more particularly whether the urging force of the lid spring which urges the lid toward the closed position is in a predetermined range. Such inspection may be effected by forcing the lid toward the open position by a pushing member which is provided with a predetermined urging force by a spring and by detecting the urging force of the lid spring through the displacement of the spring which urges the pushing member.

However, depending on the kind of the cassette the difference between the upper limit and the lower limit of the urging force of the lid spring is very large, e.g., the upper limit is 100 g and the lower limit is 10 g, and accordingly, when the inspection is effected by the pushing member which is urged by a single spring, the detecting error will be too large. On the other hand, when the upper and lower limits are detected by different pushing members, the inspecting system will be complicated and the inspecting cost will be increased.

SUMMARY OF THE INVENTION

In view of the foregoing observations and description, the primary object of the present invention is to provide a cassette inspecting system which is simple in structure and can inspect the function of the lid with a high accuracy at low cost.

The cassette inspecting system of the present invention is for inspecting whether the urging force of the lid spring is between a predetermined upper limit and a predetermined lower limit and comprises a lid opening means which is adapted to act on the lid, a light load applying means for applying a light load which urges the lid toward the open position by way of the lid opening means, the light load substantially corresponding to the lower limit of the urging force of the lid spring, a heavy load applying means for applying a heavy load which urges the lid toward the open position by way of the lid opening means after the light load applying means applies the light load, the heavy load substantially corresponding to the upper limit of the urging force of the lid spring, and a lid position detecting means which detects whether the lid is closed or opened by way of the displacement of the lid opening means.

In the cassette inspecting system in accordance with the present invention, the lid is first urged toward the open position by the lid opening means under the force provided by the light load. When the urging force of the lid spring is weaker than the force provided by the light load, the lid is opened and the lid opening means is not displaced. On the other hand, when the urging force of the lid spring is stronger than the force provided by the light load, the lid is kept closed and the lid opening means is displaced under the counterforce of the lid. Thus it is determined whether the urging force of the lid spring is weaker than the lower limit of the urging force by way of the displacement of the lid opening means. Thereafter, the lid is urged toward the open position by the lid opening means under the force provided by the heavy load. When the urging force of the lid spring is weaker than the force provided by the heavy load, the lid is opened and the lid opening means is not displaced. On the other hand, when the urging force of the lid spring is stronger than the force provided by the heavy load, the lid is kept closed and the lid opening means is displaced under the counterforce of the lid. Thus it is determined whether the urging force of the lid spring is stronger than the upper limit of the urging force by way of the displacement of the lid opening means.

So long as it can be opened and closed and is urged toward the closed position, any lid can be inspected by the inspecting system of the present invention. For example, a so-called guard panel for a VHS video cassette, a beta video cassette, an 8 mm video cassette, or a memory cassette for a cassette file; a shutter for a 3.5 inch floppy disk or a video floppy; or the like can be inspected by the inspecting system of the present invention.

DESCRIPTION OF THE PREFERRED EMBODIMENT

Figure 1:
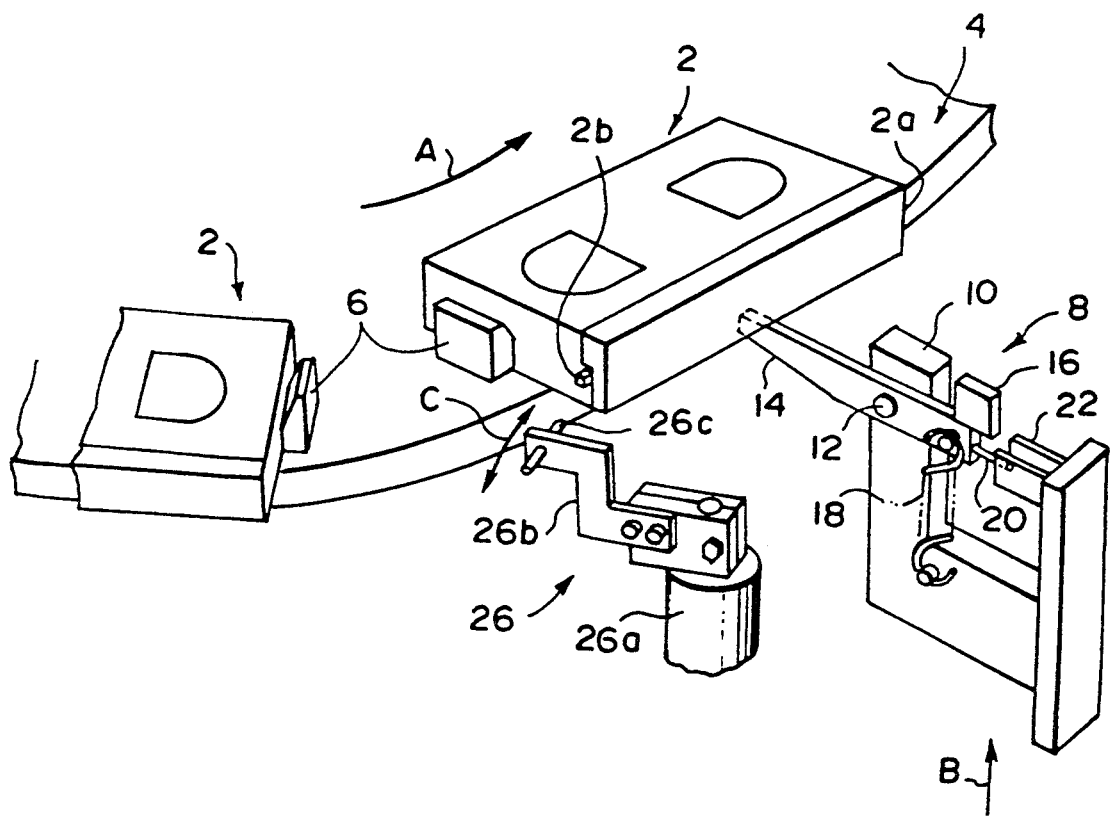
FIG. 1 is a schematic perspective view showing a cassette inspecting system in accordance with an embodiment of the present invention.
Figure 2:
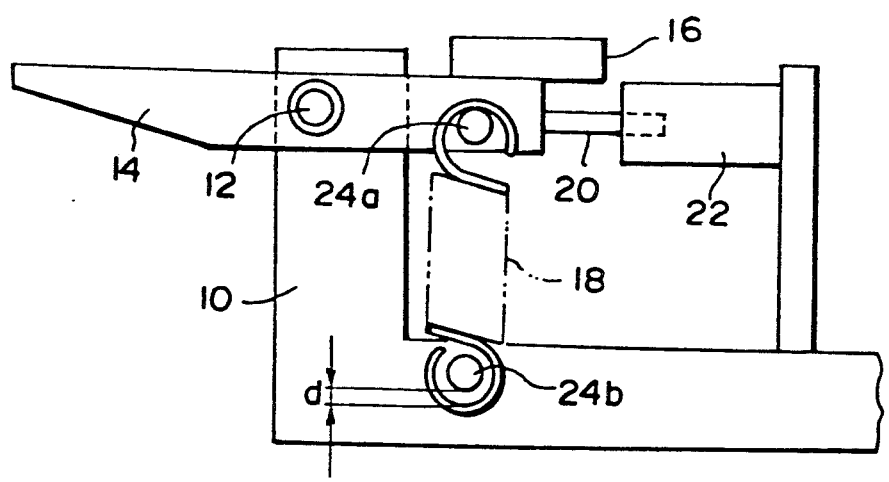
FIG. 2 is an enlarged front view showing a part of the cassette inspecting system shown in FIG. 1.

The cassette inspecting system shown in FIGS. 1 and 2 is for inspecting a VHS video cassette having a lid locking mechanism and this particular embodiment inspects both the functions of the lid and the lid locking mechanism.

In FIG. 1, a VHS video cassette 2 having a lid 2a and a lid locking mechanism is conveyed to a function inspecting station by an index table 4 which is intermittently driven in the direction of arrow A at regular intervals. The video cassette 2 is stopped there for a predetermined time and the functions of the lid 2a and the lid locking mechanisms are inspected. The video cassette 2 is positioned with respect to the index table 4 by a holding piece 6. Since the structure of the lid locking mechanism of the VHS video cassette 2 is well known and it does not form a part of the invention, the lid locking mechanism is not shown in detail and will not be described in detail here except that the lid locking mechanism has a lock pin 2b and when the lock pin 2b is pushed into the cassette body, the lid 2a is released or permitted to open.

A lid function inspecting mechanism 8 and a lock releasing mechanism 26 are provided in the function inspecting station.

The lid function inspecting mechanism 8 is movable up and down, and comprises an arm 14 which is brought into abutment against the lower face of the lid 2a of the video cassette 2 when the lid function inspecting mechanism 8 moves upward as shown by arrow B, a base 10 on which the arm 14 is pivotally mounted by a pivot 12, a balancer 16 which is mounted on the rear end of the arm 14 and applies a light load to the arm 14, a spring 18 which is connected to the rear end portion of the arm 14 at its upper end and to the base 10 at its lower end and is tensed when the arm 14 counterclockwise rotates about the pivot 12 by a predetermined angle, a projecting pin 20 which projects rearward from the rear face of the arm 14, and a sensor 22 which detects the vertical displacement of the projecting pin 20.

The lock releasing mechanism 26 comprises a releasing lever 26b which is rotated back and forth as shown by arrow C by a driving portion 26a, and a releasing pin 26c which is fixed to the releasing lever 26b and pushes the lock pin 2b into the cassette body when the releasing lever 26b rotates in the clockwise direction as seen in FIG. 1.

The operation of the cassette inspecting system of this embodiment will be described, hereinbelow.

First the releasing lever 26b is rotated in the clockwise direction to cause the releasing pin 26c to push the lock pin 2b of the video cassette 2 into the cassette body, thereby releasing the lid 2a. Thereafter, the releasing lever 26b is rotated in the reverse direction to release the lock pin 2b. If the lock mechanism locks again the lid 2a after this operation, it is determined that the lock mechanism functions normally. On the other hand, if the lock mechanism fails to lock again the lid 2a, for instance, due to flash on the lock pin 2b which interfers with the cassette body, it is determined that the lock mechanism cannot function satisfactorily. Then the lock releasing mechanism 26 is operated again to release the lid 2a, and with the lid 2a kept released, the lid function inspecting mechanism 8 is moved upward. As the lid function inspecting mechanism 8 moves upward, the front end portion of the arm 14 comes to abut against the lower face of the lid 2a and pushes upward the lid 2a. As clearly shown in FIG. 2, the upper and lower ends of the spring 18 respectively hook on spring support pins 24a and 24b which are fixed to the rear end portion of the arm 14 and the base 10. Until the arm 14 is rotated counterclockwise by a predetermined angle (substantially corresponding to distance d shown in FIG. 2) under the counterforce of the lid 2a while the lid function inspecting mechanism 8 moves upward, the spring 18 is not tensed and accordingly, at the beginning of the upward movement of the lid function inspecting mechanism 8, the counterforce of the lid 2a acting on the arm 14 is supported solely by the weight of the balancer 16. Accordingly, when the force of the spring (not shown, will be referred to as "the lid spring" hereinbelow) which urges the lid 2a toward the closed position (downward) is stronger than the force of the weight of the balancer 16 which urges the lid 2a toward the open position (upward) under the weight of the balancer 16, the lid 2a is not opened and the arm 14 is rotated counterclockwise as the lid function inspecting mechanism 8 further move upward. On the other hand, when the former is weaker than the latter, the lid 2a is opened and the arm 14 is not rotated. The weight of the balancer or the force which urges the lid 2a toward the open position under the weight of the balancer 16 is set to be substantially equal to the lower limit (e.g., 10 g) of the urging force of the lid spring. Accordingly, that the lid 2a is opened while the counterforce of the lid 2a acting on the arm 14 is supported solely by the weight of the balancer 16 means that the force of the lid spring is too weak or it is not provided at all.

When the lid 2a is not opened and the arm 14 is rotated counterclockwise as the lid function inspecting mechanism 8 further moves upward, the projecting pin 20 is displaced upward. The displacement of the projecting pin 20 is detected by the sensor 22. When the displacement of the projecting pin 20 is not detected or is less than a predetermined value, it is determined that the video cassette 2 is defective and the video cassette 2 is discharged at a discharge station which is not shown.

When the arm 14 is rotated counterclockwise as the lid function inspecting mechanism 8 further moves upward, the upper end of the spring 18 hooking on the spring support pin 24a is pulled upward and the lower end of the spring 18 is brought into engagement with the spring support pin 24b, whereby the spring 18 comes to be tensed. From this time on, the counterforce of the lid 2a acting on the arm 14 is supported by the tensile force of the spring 18 and the weight of the balancer 16. Accordingly, when the force of the lid spring is stronger than the force which is provided by the tensile force of the spring 18 and the weight of the balancer 16 and urges the lid 2a toward the open position, the lid 2a is kept closed and the arm 14 is further rotated counterclockwise as the lid function inspecting mechanism 8 moves upward. When the former is weaker than the latter, the lid 2a is opened and the arm 14 is not further rotated. The force of the spring 18 is set so that it exerts, together with the balance 16, a force which is substantially equal to the upper limit (e.g., 100 g) of the urging force of the lid spring. Accordingly, that the lid 2a is not opened in this state means that the force of the lid spring is too strong. Accordingly when the displacement of the projecting pin 20 is larger than a predetermined value, it is determined that the video cassette 2 is defective and the video cassette 2 is discharged at a discharge station which is not shown.

Figure 3:
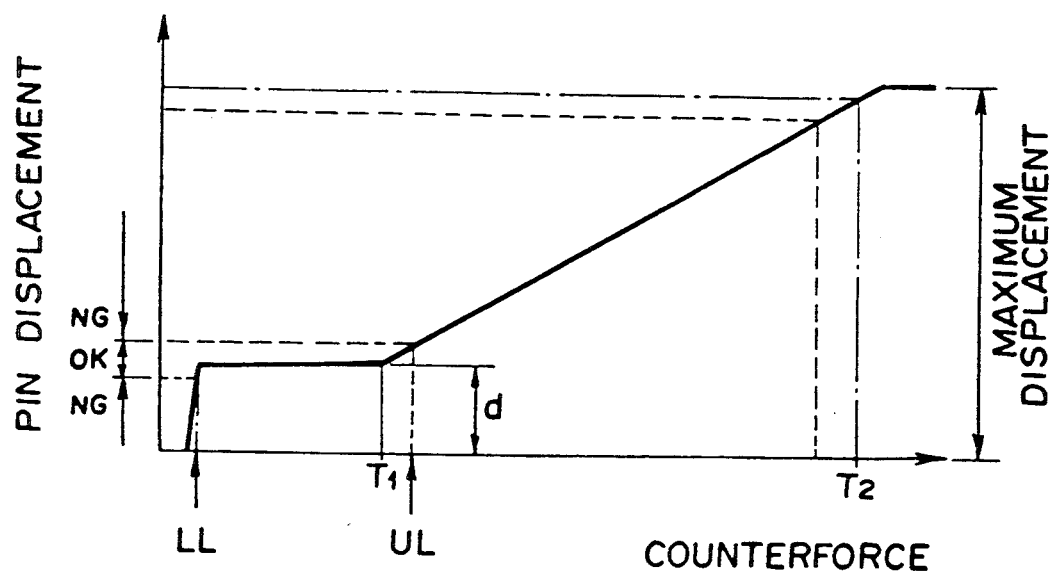
FIG. 3 is a graph showing the relation between the displacement of the projecting pin and the counterforce which the lid exerts to the arm in the system shown in FIG. 1.

FIG. 3 is a graph showing the relation between the displacement of the projecting pin 20 and the counterforce which the lid 2a exerts to the arm 14. As shown in FIG. 3, the displacement of the projecting pin 20 increases with increase in the counterforce until the spring 18 comes to be tensed, then the displacement is kept at a constant value until the spring 18 comes to be extended, and thereafter the displacement increases with increase in the counterforce. In FIG. 3, LL denotes the lower limit and the UL denotes the upper limit. T1 denotes the value of the counterforce at which the spring 18 begins to extend and T2 denotes the value of the counterforce at the elastic limit of the spring 18. As shown in FIG. 3, the weight of the balancer 16 and the spring constant of the spring 18 are selected so that the force which urges the lid 2a toward the open position under the weight of the balancer 16 is substantially equal to the lower limit LL and the upper limit UL corresponds to a value of the counterforce between T1 and T2.

For sensor 22, any sensor may be employed so long as it can detect the vertical position of the projecting pin 20. For example, an optical sensor, a magnetic sensor or the like can be employed.

The lid function inspecting mechanism 8 may be moved up and down by any driving means, such as an electric motor, an air cylinder, solenoid, a mechanical cam or the like so long as it can smoothly move the lid function inspecting mechanism 8.

Though, in the embodiment described above, the cassette 2 is conveyed to the function inspecting station by an index table 4, it may be conveyed by other means such as a feed rod, a belt conveyor, a roller conveyor or the like. In any case, the cassette should be positioned at the inspecting station.

Though, in the embodiment described, the balancer 16 is employed as means for applying a light load to the arm 14 and the spring 18 is employed as means for applying a heavy load to the arm 14, other means may be employed for applying light and heavy loads to the arm 14.

I claim:

1. A cassette inspecting system for inspecting a lid member of a cassette which is mounted on a body of said cassette, said lid member being openable and closable, and urged toward a closed position by an urging force generated by a resilient member, the inspecting system inspecting whether the urging force of the resilient member is between a predetermined upper limit and a predetermined lower limit, said system comprising:

a lid member opening means for opening said lid member;

a light load applying means for applying a light load which urges the lid member toward an open position by said lid member opening means, the light load substantially corresponding to the lower limit of the urging force of the resilient member;

a heavy load applying means for applying a heavy load which urges the lid member toward an open position by said lid member opening means after the light load applying means applies the light load, the heavy load substantially corresponding to the upper limit of the urging force of the resilient member; and a lid position detecting means for detecting whether the lid member is closed or opened by detecting displacement of the lid member opening means.

2. A cassette inspecting system for inspecting a lid member of a cassette which is mounted on a body of said cassette, said lid member being openable and closable, and urged toward a closed position by an urging force generated by a resilient member, the inspecting system inspecting whether the urging force of the resilient member is between a predetermined upper limit and a predetermined lower limit, said system comprising:

an arm member which has first and second end portions;

a base member on which the arm member is mounted for rotation about an axis between the first and second end portions in a first direction and a second direction opposite to the first direction and which is movable to move the arm member together therewith substantially in the first direction, thereby causing the first end portion of the arm member to abut against the lid member of the cassette in the first direction and to urge the lid member toward an open position;

a first load applying means for applying to the arm member a first load which generates an urging force that urges the first end portion in the first direction with a force substantially equivalent to the lower limit of the urging force of the resilient member, the first load applying member being arranged to constantly apply the first load to the arm member;

a second load applying means for applying to the arm member a second load which generates an urging force that urges the first end portion in the first direction and is arranged to apply the second load to the arm member when a counterforce of the lid member which acts on the first end portion of the arm member as the base member moves in the first direction overcomes the urging force provided by the first load applied to the arm member by the first load applying means, and displaces the arm member in the second direction by a predetermined angle, the sum of urging forces generated by the first and second load applying means being substantially equivalent to the upper limit of the urging force of the resilient member; and a position detecting means for detecting displacement of the arm member in the second direction.

3. A cassette inspecting system as defined in claim 2 in which said first load applying means comprises a balancer mounted on the second end portion of the arm member.

4. A cassette inspecting system as defined in claim 3 in which said second load applying means comprises a coil spring which is connected to the second end portion of the arm member at one end and to the base member at the other end.

5. A cassette inspecting system as defined in claim 4 in which said position detecting means detects the displacement of the arm member in the second direction through the position of the second end portion of the arm member.

* * * * *